(12) United States Patent
Pattison

(10) Patent No.: US 12,260,596 B2
(45) Date of Patent: Mar. 25, 2025

(54) HYPERSPECTRAL IMAGE COMPRESSION USING A FEATURE EXTRACTION MODEL

(71) Applicant: Apeel Technology, Inc., Goleta, CA (US)

(72) Inventor: Richard Pattison, Goleta, CA (US)

(73) Assignee: Apeel Technology, Inc., Goleta, CA (US)

( * ) Notice: Subject to any disclaimer, the term of this patent is extended or adjusted under 35 U.S.C. 154(b) by 425 days.

(21) Appl. No.: 17/667,151

(22) Filed: Feb. 8, 2022

(65) Prior Publication Data
US 2022/0270298 A1    Aug. 25, 2022

Related U.S. Application Data

(60) Provisional application No. 63/153,430, filed on Feb. 25, 2021.

(51) Int. Cl.
*G06T 9/00*    (2006.01)
*G06V 10/58*    (2022.01)

(52) U.S. Cl.
CPC .............. *G06T 9/00* (2013.01); *G06V 10/58* (2022.01)

(58) Field of Classification Search
CPC .... G06T 9/00; G06V 10/58; G06V 30/19127; G06V 10/7715
See application file for complete search history.

(56) References Cited

U.S. PATENT DOCUMENTS

2018/0365820 A1*    12/2018    Nipe ............... G06V 20/10

OTHER PUBLICATIONS

Ballester-Ripoll et al, TTHRESH: Tensor Compression for Multi-dimensional Visual Data, arXiv:1806.05952v2 Mar. 6, 2019.*
Karami et al., Hyperspectral Image Compression Based on Tucker. Decomposition and Discrete Cosine Transform, 2nd International Conference on Image Processing Theory, Tools and Applications (Year: 2010).*
Du et al., Hyperspectral biological images compression based on multiway tensor projection, IEEE International Conference on Multimedia and Expo (ICME), Jul. 2014.*

(Continued)

*Primary Examiner* — Xiao Liu
(74) *Attorney, Agent, or Firm* — Fish & Richardson P.C.

(57) ABSTRACT

A computer implemented method for reducing an amount of memory required to store hyperspectral images of an object include: obtaining tensor data representing a hyperspectral image including a first portion depicting an object and a second portion depicting at least a portion of a surrounding environment where the object is located; identifying a portion of the tensor data representing the hyperspectral image that corresponds to the first portion; providing the identified portion of the tensor data representing the hyperspectral image as an input to a feature extraction model; obtaining one or more matrix structures as output by the feature extraction model based on the feature extraction model processing the identified portion of the tensor data, the one or more matrix structures representing a subset of features extracted from the identified portion of the tensor data; and storing the one or more matrix structures in a memory device.

20 Claims, 7 Drawing Sheets

(56) References Cited

OTHER PUBLICATIONS

Zhang et al., Tensor Discriminative Locality Alignment for Hyperspectral Image Spectral-Spatial Feature Extraction, IEEE Transections on Geoscience and Remote Sensing, pp. 242-256, Jan. 2013.*
Zhang et al, A Multifeature Tensor for Remote-Sensing Target Recognition, IEEE Geoscience and Remote Sensing Letters, vol. 8, No. 2, pp. 374-378, Mar. 2011.*
Bioucas-Dias et al, Hyperspectral Remote Sensing Data Analysis and Future Challenges, Ieee Geoscience and remote sensing 6 magazine, Jun. 2013.*
Willett et al, Sparsity and Structure in Hyperspectral Imaging: Sensing, Reconstruction, and Target Detection, IEEE Signal Processing Magazine, vol. 31, Issue: 1, Jan. 2014.*
Du et al., "Hyperspectral biological images compression based on multiway tensor projection," 2014 IEEE International Conference on Multimedia and Expo (ICME), Jul. 2014, 6 pages.
International Search Report and Written Opinion in International Appln. No. PCT/US2022/015640, mailed May 25, 2022, 14 pages.
Zhang et al., "Tensor Discriminative Locality Alignment for Hyperspectral Image Spectral—Spatial Feature Extraction," IEEE Transactions on Geoscience and Remote Sensing, Jan. 2013, 51(1):242-256.
wikipedia.org [online], "Multilinear principal component analysis," May 14, 2016, last updated Mar. 9, 2022, retrieved on Apr. 25, 2022, retrieved from URL <https://en.wikipedia.org/wiki/Multilinear_principal_component_analysis>, 3 pages.
wikipedia.org [online], "Tucker decomposition," Aug. 21, 2008, last updated Jun. 29, 2021, retrieved on Apr. 25, 2021, retrieved from URL <https://en.wikipedia.org/wiki/Tucker_decomposition>, 2 pages.

\* cited by examiner

400

```
┌─────────────────────────────────────────────────────────┐
│ OBTAIN TENSOR DATA REPRESENTING A HYPERSPECTRAL IMAGE   │
│ INCLUDING A FIRST PORTION THAT DEPICTS AN OBJECT    402 │
└─────────────────────────────────────────────────────────┘
                            │
                            ▼
┌─────────────────────────────────────────────────────────┐
│ IDENTIFY A PORTION OF THE TENSOR DATA CORRESPONDING TO  │
│ THE FIRST PORTION OF THE HYPERSPECTRAL IMAGE        404 │
└─────────────────────────────────────────────────────────┘
                            │
                            ▼
┌─────────────────────────────────────────────────────────┐
│ PROVIDE THE IDENTIFIED PORTION OF THE TENSOR DATA AND   │
│ ONE OR MORE MATRIX STRUCTURES OUTPUT BY A FEATURE       │
│ EXTRACTION MODEL TO A COMPRESSION ENGINE            406 │
└─────────────────────────────────────────────────────────┘
                            │
                            ▼
┌─────────────────────────────────────────────────────────┐
│ OBTAIN A CORE MATRIX STRUCTURE OUTPUT BY THE            │
│ COMPRESSION ENGINE BASED ON THE IDENTIFIED PORTION OF   │
│ THE TENSOR DATA                                     408 │
└─────────────────────────────────────────────────────────┘
                            │
                            ▼
┌─────────────────────────────────────────────────────────┐
│ STORE THE CORE MATRIX STRUCTURE IN A MEMORY DEVICE      │
│                                                     410 │
└─────────────────────────────────────────────────────────┘
```

FIG. 4

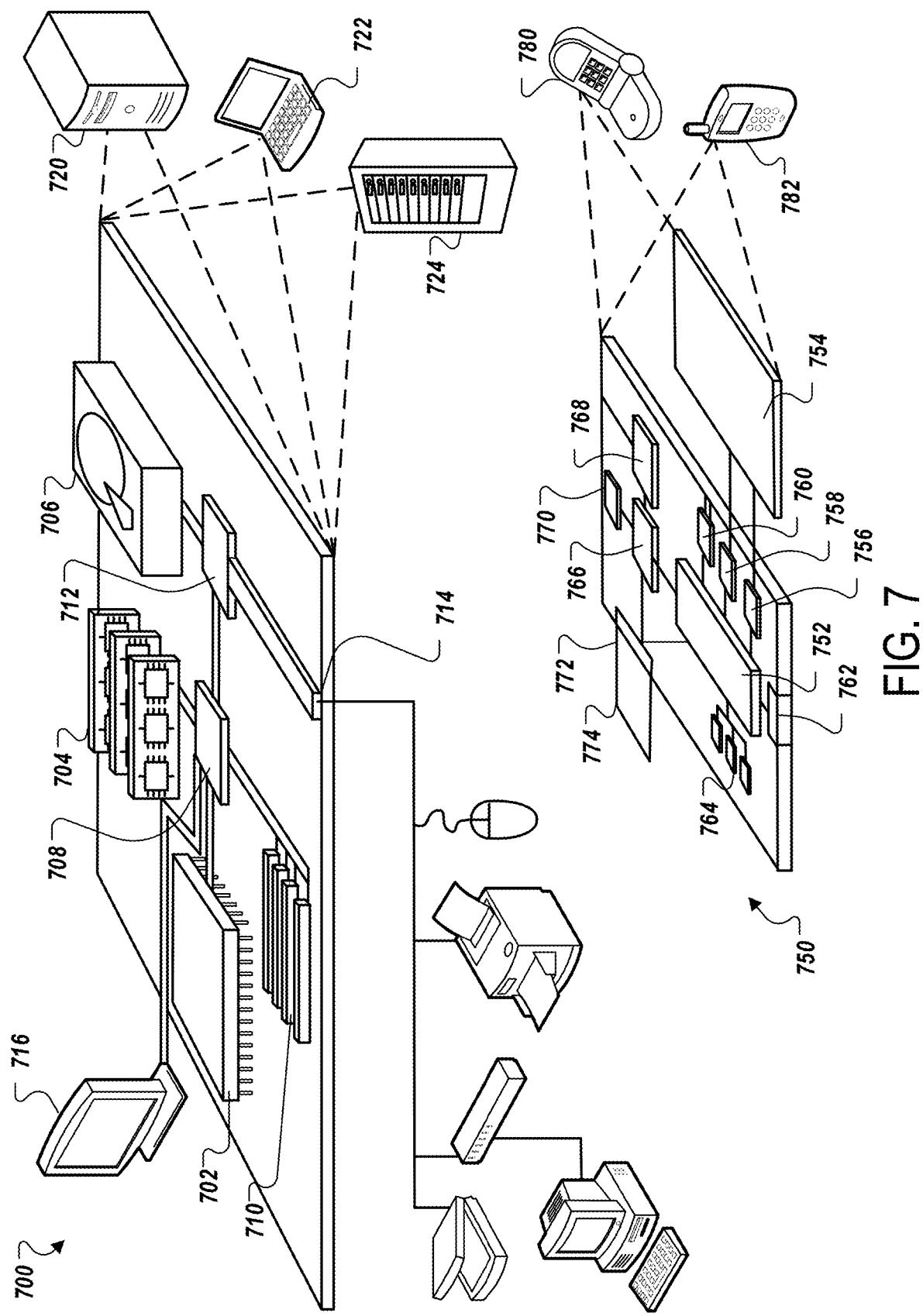

HYPERSPECTRAL IMAGE COMPRESSION USING A FEATURE EXTRACTION MODEL

CROSS-REFERENCE TO RELATED APPLICATION

This application claims priority to U.S. Application No. 63/153,430, filed Feb. 25, 2021, the disclosure of which is incorporated herein by reference.

BACKGROUND

Industrial food production and preparation sites involve data acquisition and processing. In some cases, hyperspectral cameras capture hyperspectral images of food items that include hyperspectral data over a range of the electromagnetic spectrum. The hyperspectral data can be used to determine features of the food items and contribute to classification, sorting, or other processes.

SUMMARY

One or more preferred embodiments described herein include a method for reducing an amount of memory required to store hyperspectral images of an object, the method including: obtaining, by one or more computers, tensor data representing a hyperspectral image, the hyperspectral image including a first portion that depicts an object and a second portion that depicts at least a portion of a surrounding environment where the object is located, identifying, by the one or more computers, a portion of the tensor data representing the hyperspectral image that corresponds to the first portion of the hyperspectral image, providing, by the one or more computers, the identified portion of the tensor data representing the hyperspectral image as an input to a feature extraction model, the feature extraction model having been trained using a training dataset to process portions of tensor data of other hyperspectral images to determine one or more matrix structures associated with the other hyperspectral images, obtaining, by the one or more computers, one or more matrix structures as output from the feature extraction model, the one or more matrix structures representing a subset of features extracted from the identified portion of the tensor data representing the hyperspectral image, and storing, by the one or more computers, the one or more matrix structures in a memory device.

In some implementations, the method can optionally include one or more of the following features. For example, the object depicted by the hyperspectral image can be a food item, the food item being at least one of a citrus fruit, a mango, an apple, a berry, a stone fruit, a tomato, meat, and a vegetable. The method can also include receiving, by the one or more computers from a hyperspectral sensor, the hyperspectral image, the hyperspectral sensor being configured to detect light waves having a wavelength between approximately 520 nm to 950 nm. In some implementations, the method can also include normalizing, by the one or more computers, the identified portion of the tensor data representing the hyperspectral image, and providing, by the one or more computers, the identified portion of the tensor data representing the hyperspectral image as an input to a feature extraction model can include providing the normalized tensor data as the input to the feature extraction model. In some implementations, the feature extraction model can be an unsupervised learning model. Sometimes, the feature extraction model can be a supervised learning model.

As another example, the feature extraction model can be a multilinear principal component analysis model having one or more user defined parameters defining one or more matrix structures to be produced based on processing, by the feature extraction model, the portion of the tensor data representing the hyperspectral image, the user defined parameters including a height and a width of each matrix structure of the one or more matric structures. At least one of the one or more matrix structures can include data that represents a spectral domain of the hyperspectral image.

In some implementations, the method can also include providing, by the one or more computers, (i) the identified portion of the tensor data and (ii) the one or more matrix structures outputted by the feature extraction model as input to a compression engine, obtaining, by the one or more computers, a core matrix structure as output from the compression engine, and storing, by the one or more computers, the core matrix structure in the memory device. The core matrix structure can be generated by the compression engine based on performing an n-mode dot product on the identified portion of the tensor data that corresponds to the object represented by the one or more matrix structures. The method can also include performing, by the one or more computers, a first matrix operation on a first set of the one or more matrix structures to generate a second set of one or more matrix structures, performing, by the one or more computers, a second matrix operation on (i) the second set of one or more matrix structures and (ii) the core matrix structure outputted by the compression engine, and generating, by the one or more computers, a reconstructed matrix based on performing the second matrix operation, wherein the reconstructed matrix represents features of the identified portion of tensor data.

One or more preferred embodiments can include a method for compressing hyperspectral images of an object, the method including: obtaining, by one or more computers, tensor data representing a hyperspectral image, the hyperspectral image including a first portion that depicts an object and a second portion that depicts at least a portion of a surrounding environment where the object is located, the object being a food item, identifying, by the one or more computers, a portion of the tensor data representing the hyperspectral image that corresponds to the first portion of the hyperspectral image, providing, by the one or more computers, (i) the identified portion of the tensor data and (ii) one or more matrix structures outputted by a feature extraction model as input to a compression engine, the one or more matrix structures representing a subset of features extracted from the identified portion of the tensor data by the feature extraction model, obtaining, by the one or more computers, a core matrix structure as output from the compression engine, the core matrix structure being a compressed core of (i) and (ii), and storing, by the one or more computers, the core matrix structure in a memory device.

In some implementations, the method can optionally include one or more of the following features. For example, the compression engine can be configured to generate compressed cores for each object represented in hyperspectral data, the hyperspectral data being centered and normalized by the one or more computers. The core matrix structure can be generated, by the compression engine, based on performing matrix multiplication on (i) and (ii). The core matrix structure can also be generated, by the compression engine, based on performing an n-mode dot product on (i) corresponding to the object represented by (ii).

One or more preferred embodiments can also include a method for reconstructing hyperspectral images of an object from a core matrix structure, the method including obtaining, by one or more computers, a core matrix structure outputted by a compression engine, the core matrix structure being a compressed core of (i) an identified portion of tensor data representing a hyperspectral image, the identified portion corresponding to an object in the hyperspectral image, and (ii) a first set of one or more matrix structures representing features extracted, by a feature extraction model, from the identified portion of the tensor data, performing, by the one or more computers, a first matrix operation on the first set of one or more matrix structures to generate a second set of one or more matrix structures, performing, by the one or more computers, a second matrix operation on the second set of one or more matrix structures and the core matrix structure, generating, by the one or more computers, a reconstructed matrix based on performing the second matrix operation, the reconstructed matrix representing features of the identified portion of tensor data.

In some implementations, the method can optionally include one or more of the following features. For example, the first matrix operation can include transposing the first set of one or more matrix structures to generate the second set of one or more matrix structures. The second matrix operation can include calculating a tensor product of the transposed set of one or more matrix structures and the core matrix structure. The second matrix operation can include calculating a tensor product of the second set of one or more matrix structures and the core matrix structure. Generating, by the one or more computers, a reconstructed matrix can be based on the tensor product.

According to one innovative aspect of the present disclosure, a method for reducing an amount of memory required to store hyperspectral images is disclosed. In one aspect, the method can include actions of obtaining, by one or more computers, tensor data representing a hyperspectral image, wherein the hyperspectral image includes a first portion that depicts an object and a second portion that depicts at least a portion of a surrounding environment where the object is located, identifying, by one or more computers, a portion of the tensor data representing the hyperspectral image that corresponds to the first portion of the hyperspectral image, providing, by one more computers, the identified portion of the tensor data representing the hyperspectral image as an input to a feature extraction model, obtaining, by one or more computers, one or more matrix structures output by the feature extraction model based on the feature extraction model processing the identified portion of the tensor data, the one or more matrix structures representing a subset of features extracted from the identified portion of the tensor data representing the hyperspectral image by the feature extraction model, and storing, by one or more computers, the one or more matrix structures in a memory device.

Other versions include corresponding systems, apparatus, and computer programs to perform the actions of methods defined by instructions encoded on computer readable storage devices.

These and other versions may optionally include one or more of the following features. For instance, in some implementations, the object depicted by the hyperspectral image is a food item.

In some implementations, the food item can be a citrus, mango, apple, berrie, stone fruit, tomatoe, meat, or vegetable.

In some implementations, the hyperspectral image can be generated based on a hyperspectral sensor detecting light waves having a wavelength of 534 nm to 942 nm.

In some implementations, the hyperspectral image can be generated based on a hyperspectral sensor detecting light waves having a wavelength of 690 nm to 912 nm.

In some implementations, the hyperspectral image can be generated based on a hyperspectral sensor detecting light waves having a wavelength of 672 nm to 948 nm.

In some implementations, the method can further include normalizing, by one or more computers, the identified portion of the tensor data representing the hyperspectral image. In such implementations providing, by one more computers, the identified portion of the tensor data representing the hyperspectral image as an input to a feature extraction model can include providing, by one or more computers, the normalized tensor data representing the hyperspectral image as an input to the feature extraction model.

In some implementations, the feature extraction model can be an unsupervised learning model.

In some implementations, the feature extraction model can be a supervised learning model.

In some implementations, the feature extraction model can be a multilinear principal component analysis model having one or more user defined parameters defining one or more matrix structures that are to be produced based on the feature extraction model's processing of tensor data representing a hyperspectral image.

In some implementations, the one or more user defined parameters of the one or more matrix structures can include a height and a width of each matrix structure.

In some implementations, at least one of the one or more matrix structures can include data that represents the spectral domain of the hyperspectral image.

According to another innovative aspect of the present disclosure, a method for compressing data is disclosed. In one aspect, method can include actions of obtaining, by one or more computers, tensor data representing a hyperspectral image, wherein the hyperspectral image includes a first portion that depicts an object and a second portion that depicts at least a portion of a surrounding environment where the object is located identifying, by the one or more computers, a portion of the tensor data representing the hyperspectral image that corresponds to the first portion of the hyperspectral image, providing, by the one or more computers, the identified portion of the tensor data and one or more matrix structures output by a feature extraction model to a compression engine, obtaining, by the one or more computers, a core matrix structure output by the compression engine based on the identified portion of the tensor data, and storing, by the one or more computers, the core matrix structure in a memory device.

According to another innovative aspect of the present disclosure, a method for decompressing data is disclosed. In one aspect, the method can include actions of obtaining, by one or more computers, a core matrix structure output by a compression engine based on an identified portion of tensor data, obtaining, by the one or more computers, a first set of one or more matrix structures output by a feature extraction model based on the identified portion of the tensor data, performing, by the one or more computers, a first matrix operation on the first set of one or more matrix structures to generate a second set of one or more matrix structures, performing, by the one or more computers, a second matrix operation on the second set of one or more matrix structures and the core matrix structure output by the compression engine, and generating, by the one or more computers, a reconstructed matrix based on performing the second matrix operation that represents features of the identified portion of tensor data.

These and other features and advantages of the invention will become apparent from the description, the drawings, and the claims.

BRIEF DESCRIPTION OF THE DRAWINGS

FIG. 4 is a flow diagram illustrating an example of a method for hyperspectral image compression using generated factor matrices.

FIG. 7 is a diagram of computer system components that can be used to implement a system for machine learning based compression for hyperspectral images.

Like reference numbers and designations in the various drawings indicate like elements.

DETAILED DESCRIPTION

The present disclosure is directed towards methods, systems, and computer programs for compression for hyperspectral images. Currently, capturing hyperspectral imaging data provides an opportunity to generate inferences about objects. For example, in food production, hyperspectral images can be analyzed by an entity such as a trained model or classifier to gauge ripeness. Analysis can reveal whether or not the given product should be shipped to a customer or requires additional ripening. Unlike manual processes, analysis of hyperspectral images is non-destructive, can be performed in-line with other processes, e.g. along a conveyer belt, and can easily be automated. However, implementing a production system using hyperspectral image analysis requires large amounts of data storage which can be cost prohibitive given the current cost of commercial data storage.

In one aspect, the present disclosure relates to machine learning based compression for hyperspectral images. The hyperspectral images can be stored as one or more multi-dimensional tensor data structures including intensity profiles across a range of the electromagnetic spectrum. Portions of the multi-dimensional tensor data represent objects in a production environment. The portions of the multi-dimensional tensor data representing the objects can be identified and used to train a model by iteratively performing matrix operations such as partial singular value decompositions (SVD). The trained model can then generate factor matrices that are used to compress similar portions of multi-dimensional tensor data representing obtained hyperspectral images. The factor matrices used to compress the tensor data can similarly be used to decompress the data. The model can be trained to retain distinguishing features while minimizing the data footprint of a resulting compressed core. In this way, the machine learning based compression method can effectively reduce the cost of capturing and storing hyperspectral imaging data. The accuracy and convenience of hyperspectral analysis can thus be realized at production scale.

Figure 1:
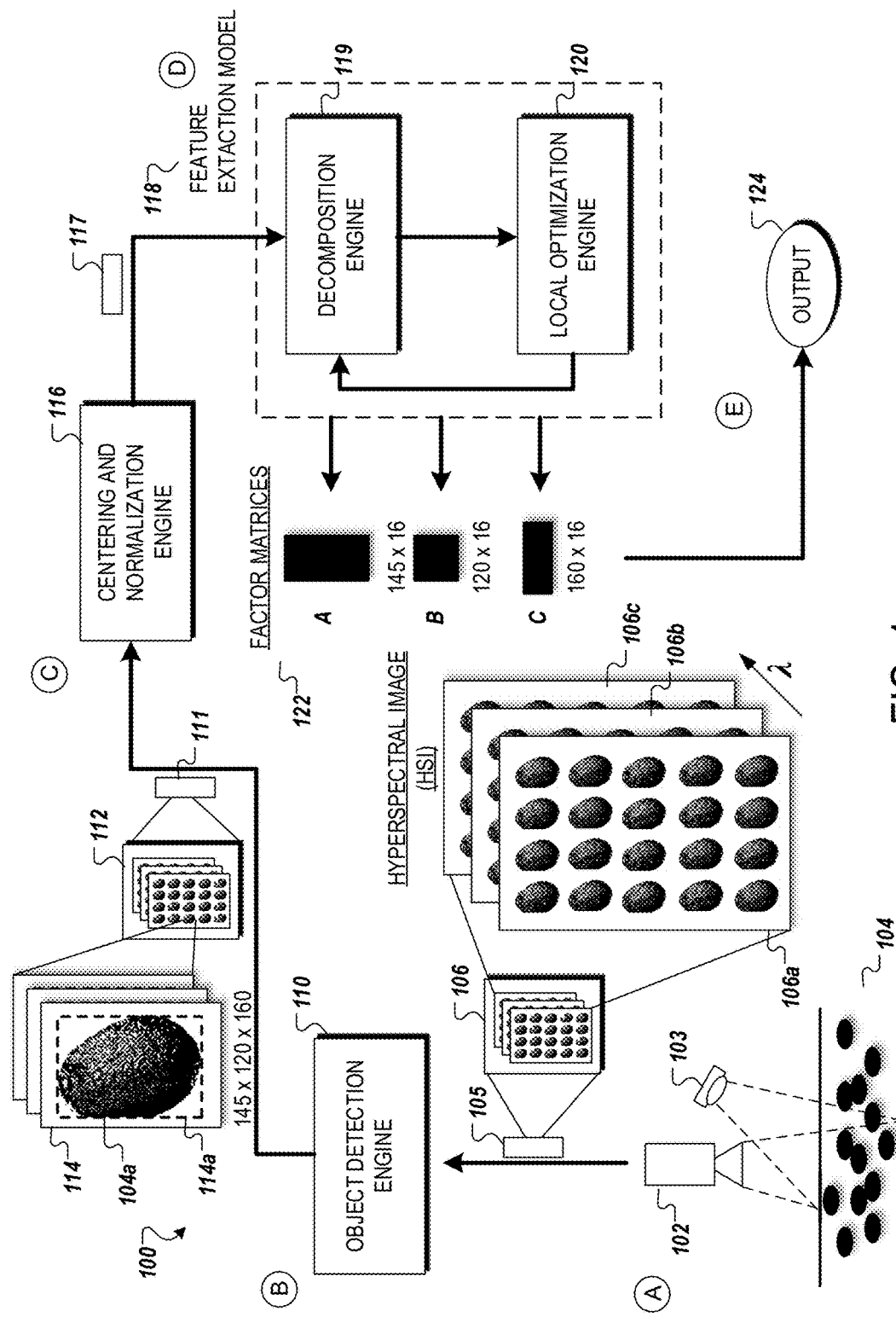
FIG. 1 is a diagram showing an example of factor matrix generation by a system for machine learning based compression for hyperspectral images.

FIG. 1 is a diagram showing an example of factor matrix generation by a system 100 for machine learning based compression for hyperspectral images. The system 100 includes a hyperspectral image sensor 102 that captures initial hyperspectral data 105 of objects 104. A light source 103 can be used to illuminate the objects 104 using a predetermined spectrum of electromagnetic radiation. The system 100 further includes an object detection engine 110 that obtains the initial hyperspectral data 105 of the objects 104, a centering and normalization engine 116 that obtains object detected hyperspectral data 111 corresponding to the initial hyperspectral data 105, and a feature extraction model 118 including a decomposition engine 119 and a local optimization engine 120 that generate factor matrices 122 corresponding to the centered and normalized hyperspectral data 117. For purposes of the present disclosure, an "engine" is intended to mean one or more software modules, one or more hardware modules, or a combination of both, that, when used to process input data, cause one or more computers to realize the functionality attributed to the "engine" by the present disclosure.

In some implementations, the hyperspectral image sensor 102 obtains data corresponding to one or more hyperspectral data cubes (also referred to herein as "one or more hyperspectral data cubes). The hyperspectral data cube can include, for example, data representing two spatial dimensions of a captured image of a scene that depicts an object, such as a food item as shown in the example of FIG. 1, and data representing a third dimension of a captured image that represents an amount of electromagnetic radiation at a plurality of different frequencies, as observed by the hyperspectral image sensor 102. In the example of FIG. 1, the objects 104 are avocados although it is contemplated that other objects that are not avocados can be imaged in a similar way. For example hyperspectral data of other food items such as citrus, mangos, apples, berries, stone fruits, tomatoes, meat, or vegetables as well as non-food items such as electronic circuit boards or devices can be processed in a similar manner as the initial hyperspectral data 105 depicted in the example of FIG. 1.

In some implementations, the initial hyperspectral data 105 of FIG. 1 is defined by user parameters. For example, the initial hyperspectral data 105 can include data corresponding to electromagnetic radiation with a wavelength of 400 nanometers (nm) to electromagnetic radiation with a wavelength of 1000 nm. For another example, the initial hyperspectral data 105 can include multiple images of a predefined height and width where each image of the multiple images depicts electromagnetic intensity of a given wavelength at each pixel of the image.

In some implementations, images stored in the initial hyperspectral data 105 depict electromagnetic intensity at different wavelengths. For example, a first image in the initial hyperspectral data 105 can depict electromagnetic intensity at a wavelength of 400 nm while a second image in the initial hyperspectral data 105 can depict electromagnetic intensity at a wavelength of 403 nm. Subsequent images can depict electromagnetic intensity of a certain wavelength where the certain wavelength is monotonically increasing to a predefined maximum wavelength such as 1000 nm. In some implementations, images of the initial hyperspectral data 105 are monotonically decreasing. For example, the first image can depict electromagnetic intensity at 1000 nm while the second image in the initial hyperspectral data 105 can depict electromagnetic intensity at a wavelength of 997 nm. Subsequent images can depict electromagnetic intensity of a certain wavelength where the certain wavelength is monotonically decreasing to a predefined minimum wavelength such as 400 nm.

In stage A, the hyperspectral image sensor 102 captures the initial hyperspectral data 105 corresponding to the objects 104. For ease of explanation, the objects 104 are depicted as avocados. In some implementations, the objects of the example of FIG. 1 are other food items. For example, the objects of the example of FIG. 1 can include a citrus, mangos, apples, berries, stone fruits, tomatoes, meat, vegetable, or other edible object. In some implementations, the objects of the example of FIG. 1 are non-food objects. For example, the objects of the example of FIG. 1 can be electronic in nature such as electronic devices, circuit boards, or any inanimate object.

The initial hyperspectral data 105 of FIG. 1 is depicted visually as a hyperspectral image 106. The hyperspectral image 106 depicts multiple objects, including the objects 104 in the example of FIG. 1. The hyperspectral image 106 includes multiple images that capture electromagnetic intensity of a captured scene that includes the objects 104 at different wavelengths across an electromagnetic range. For example, image 106a depicts the objects 104 using electromagnetic radiation intensity of a first wavelength. Image 106b depicts the objects 104 using electromagnetic radiation intensity of a second wavelength. Image 106c depicts the objects 104 using electromagnetic radiation intensity of a third wavelength.

In the example of FIG. 1, the electromagnetic range is 400 nm to 1000 nm. Each of the images 106a, 106b, and 106c depict the objects 104 using electromagnetic radiation intensity of a certain wavelength within the electromagnetic range of 400 nm to 1000 nm. In some implementations, other ranges are used. For example, in cases where relevant phenomena may be perceived from wavelengths ranging from 500 nm to 900 nm, it can be advantageous only to capture electromagnetic radiation within a wavelength range of 500 nm to 900 nm. In this way, data storage usage can be conserved.

In some implementations, one or more light sources can be used to illuminate the objects 104. For example, the light source 103 can illuminate the objects 104 such that the hyperspectral image sensor 102 obtains light from the light source 103 that is reflected by the objects 104. The light source 103 may be arranged with one or more other light sources can be that produce the same or different electromagnetic radiation. The light source 103 can be affixed to, or placed within a vicinity of, the hyperspectral image sensor 102 to illuminate the objects 104 before, or during, capturing of the initial hyperspectral data by the hyperspectral image sensor 102. In some implementations, the one or more light sources are chosen based on the frequency of the electromagnetic radiation provided by the one or more light sources. For example, the light source 103 can be a halogen light source or a diode within a series of broadband light-emitting diodes (LEDs) that can be used to provide light across the visible and near infrared wavelengths. In general, any light source can be used to provide light for the hyperspectral image sensor 102.

In some implementations, the one or more light sources or a control unit of the one or more light sources are communicably connected to the hyperspectral image sensor 102 or a control unit of the hyperspectral image sensor 102. For example, the hyperspectral image sensor 102 or the control unit of the hyperspectral image sensor 102 can send a signal to the one or more light sources or a control unit of the one or more light sources such that the one or more light sources illuminate the objects 104 with one or more specific frequencies of light at a specific power and at a specific moment in time. In some cases, the specific moment in time can be a predetermined amount of time before the hyperspectral image sensor 102 captures the initial hyperspectral data 105 such that the hyperspectral image sensor 102 captures the initial hyperspectral data 105 of the objects 104 when the objects 104 are illuminated and not before or after when the objects 104 are illuminated.

The control unit of the hyperspectral image sensor 102 can be a computer that sends signals to the hyperspectral image sensor 102 in order to capture one or more hyperspectral images or affect the capture of the one or more hyperspectral images. The control unit of the one or more light sources can also be a computer that sends signals to the one or more light sources such that the one or more light sources provide light in response to the signals sent by the control unit of the one or more light sources or the light provided by the one or more light sources is affected by the signals sent by the control unit of the one or more light sources.

Although only the images 106a, 106b, and 106c are shown corresponding to the hyperspectral image 106 of the initial hyperspectral data 105, in an actual implementation, other images capturing other wavelengths can be included within the initial hyperspectral data 105. For example, a user or another automated process can set the electromagnetic spectrum to be captured by the hyperspectral image sensor 102 as the spectrum ranging from 400 nm to 2500 nm. For another example, the hyperspectral image sensor 102 can detect infrared radiation in a range of 900 nm to 1700 nm or any other range such as 900 nm to 2500 nm. The particular radiation captured by the hyperspectral image sensor 102 can be customizable and customized by an automated process based on a type of item or a particular processing or manufacturing process within an environment that includes the hyperspectral image sensor 102. For example, a first radiation spectrum can be used by a hyperspectral sensor such as the hyperspectral image sensor 102 for processing or manufacturing of a first type of item when the first type of item is detected. A second radiation spectrum different from the first radiation spectrum can be used by a hyperspectral sensor for processing or manufacturing of a second type of item when the second type of item is detected. One or more light sources can provide light of specific frequencies to illuminate the objects 104 such that the hyperspectral image sensor 102 captures data corresponding to the initial hyperspectral data 105 when the objects 104 are illuminated by the one or more light sources.

By way of example, the light source 103 can be configured to output a particular wavelength of light based on the type of object 104 that is moving along the conveyor of system 100. For example, if the objects 104 include avocados, the control unit of the light source 103 can be configured to instruct the light source 103 to output light having a wavelength range of 534 nm to 942 nm, as such wavelengths of light have been determined to be useful in generating, by the hyperspectral image sensor 102, initial hyperspectral image data 105.

By way of another example, if the objects 104 include apples, the control unit of the light source 103 can be configured to instruct the light source 103 to output light having a wavelength range of 672 nm to 948 nm, as such wavelengths of light have been determined to be useful in generation, by the hyperspectral image sensor 102, initial hyperspectral image data 105.

The aforementioned ranges of wavelengths of light for particular implementations are set forth in the above exemplary implementations. These examples are provided to show that the light output by the light source 103 can be customized based on the type of object 104 moving along the conveyor of system 100. However, the present disclosure is not limited to these objects or these light wavelength ranges.

The user or automated process can further determine a separation between adjacent images of the initial hyperspectral data 105 to be 3 nm resulting in 200 images, each capturing electromagnetic intensity of a different wavelength, included in the initial hyperspectral data 105. In some implementations, other ranges, separations, or number of images are used. In general, a user or automated process can set a system, such as the system 100, to capture any number of images spanning any range of electromagnetic radiation.

In stage B of FIG. 1, the hyperspectral image sensor 102 provides the initial hyperspectral data 105 to the object detection engine 110 of the system 100. The initial hyperspectral data 105 can depict at least a portion of a surrounding environment where the objects 104 are located such as the surface of a conveyer belt or bottom of a container. The object detection engine 110 determines at least a portion of the initial hyperspectral data 105 that depicts an object of the objects 104 and not the surrounding environment where the objects 104 are located and determines a boundary between each object of the objects 104 and the surrounding environment.

In order to determine the portion of the initial hyperspectral data 105 that depicts an object of the objects 104, the object detection engine 110 uses object recognition algorithms to recognized portions of the initial hyperspectral data 105 that correspond with known features of the objects 104. For example, as shown in FIG. 1, the objects 104 are avocados. The object detection engine 110 in this case can be trained on a plurality of images of avocados such that the object detection engine 110 can determine, based on an input image, whether or not the input image includes a representation of an avocado and where the representation of the avocado appears within the input image. Although avocados are considered here, in other implementations, the object detection engine 110 can be used to detect other objects such as other food items or non-food objects as described in this specification.

In some implementations, a coordinate system can be used to determine the location of the representation of an object. For example, one or more numerical values, such as x and y values in an x and y coordinate system, can be used to represent the location of the object. Subsequent processing steps can use the numerical values that represent the location of the object and determine, based on the numerical values, where in a given image, the object is located.

In some implementations, the object detection engine 110 can include a network of one or more machine learning models. In such implementations, the network of one or more machine learning models of the object detection engine 110 can be trained based on a training data set of a particular object to detect. In the example of FIG. 1, the object detection engine 110 can be trained on images of avocados such that the object detection engine 110 can detect the location and appearance of avocados within a given input image.

In stage C, the object detection engine 110 sends the object detected hyperspectral data 111 to the centering and normalization engine 116. The object detected hyperspectral data 111 includes an indication of the location of each object of the objects 104 that are represented within the initial hyperspectral data 105. Item 114 shows one example of output from the object detection engine 110. In this example, the object detection engine 110 uses one or more bounding boxes including a bounding box 114a to circumscribe an object 104a of the objects 104. In the example of FIG. 1, each object of the objects 104 that are contained within the object detected hyperspectral data 111 includes an image of 145 pixels by 120 pixels. The object 104a is depicted with the intensities of 160 different electromagnetic radiation wavelengths leading to a hyperspectral data cube of 145 by 120 by 160. In general, and in other implementations, any dimension of hyperspectral data can be used to represent objects including any number of pixels and any number of different wavelengths.

The centering and normalization engine 116 standardizes the plurality of objects included in the object detected hyperspectral data 111 and generates the centered and normalized hyperspectral data 117. In some implementations, the generated centered and normalized hyperspectral data 117 can include a representation of a plurality of objects 104 where each object of the objects 104 is labeled by its position in a grid of the objects 104 such that individual objects can be tracked. The generated centered and normalized hyperspectral data 117 can be provided as an input to the feature extraction model 118.

In stage D, the feature extraction model 118 can obtain the centered and normalized hyperspectral data 117 generated by the centering and normalization engine 116. In some implementations, the feature extraction model 118 can perform operations of a multilinear subspace learning (MSL) algorithm. For the specific problem of reducing data storage of hyperspectral images, MSL algorithms can provide a means to retain variance of an original data set, in this case the centered and normalized hyperspectral data 117, while reducing the number of required learned parameters. In some implementations, the feature extraction model 118 can perform the operations of the MSL algorithm using the decomposition engine 119 and the local optimization engine 120.

In some implementations, the feature extraction model 118 is configured to accept inputs and iteratively perform matrix operations until a threshold condition is reached. For example, the feature extraction model 118 of FIG. 1 can receive as input, a tensor T of dimension N by W by H by S and predetermined core dimensions $W\_c$, $H\_c$, and $S\_c$ where the modes of the tensor are represented by W, H, and S. In the example of FIG. 1, the tensor T is a portion of the centered and normalized hyperspectral data 117. The feature extraction model 118 can then perform the iterative operations of (i) approximating a core by calculating a multimode dot product of the tensor T with an initialized factor matrix set including the factor matrices 122, (ii) unfolding the core approximation in a given dimension, (iii) computing a decomposition of the unfolded core approximation to generate eigenvectors that are factors of the given core dimension, and (iv) computing an error term using the core approximation, the factors of the given dimension, and the tensor T. Iterations of the above operations are stopped when a stopping condition is reached such as when an error term satisfies an error threshold or when an iteration count satisfies an iteration threshold.

In some implementations, the error term of the iterative operations can include a calculation of a tensor product. For example, the error term can include calculating a tensor product of the core approximation as described above with a transposed version of the factors of the given dimension. The tensor product can then be a reconstructed representation of the original tensor T. For a given implementation, as the representation of the original tensor T generated by the feature extraction model 118 becomes more similar to the original tensor T, the error term is reduced until the representation of the original tensor T is sufficiently similar to the original tensor T such that the error term satisfies the threshold. Once the error term satisfies the threshold, the iterations can stop and the feature extraction model 118 can output a factor matrix for each corresponding dimension considered by the feature extraction model 118.

The hyperspectral data cube of an object of the objects 104 included in the centered and normalized hyperspectral data 117, has dimensions of 145 pixels by 120 pixels by 160 different wavelengths. As discussed, other pixel counts and wavelengths including other dimensional values can be used for the hyperspectral data in other implementations but, for ease of explanation, the case of hyperspectral data cubes with 145 pixels by 120 pixels by 160 different wavelengths will be considered. In pursuing a vector-based approach such as linear principal component analysis (PCA), a resulting vector for the hyperspectral data cube of this example would require a vector with around 2.7 million rows and compressing the vector into a number of principal components, such as 30, would require learning over 80 million parameters. In contrast, by pursuing a multilinear subspace approach, the number of learned parameters can be reduced while retaining variance within the dataset. For example, a corresponding multilinear subspace approach would only require 6,800 learned parameters corresponding to the elements of each factor matrix to generate a compressed version of the data set.

By reducing the number of learned parameters, a multilinear subspace approach is also less prone to overfitting a given data set compared to other approaches such as a vector-based approach. A multilinear subspace approach for compressing hyperspectral images thus provides suitable means to arrange the information of a given data set such as the centered and normalized hyperspectral data 117 of the example of FIG. 1 so as to retain variance and other information and limit reconstruction error where compressed images using factor matrices generated by a multilinear subspace approach are decompressed.

Accordingly, the feature extraction model 118 can be configured to obtain the centered and normalized hyperspectral data 117 that is a form of tensor data and use a multilinear subspace approach to compress similar tensor data into smaller tensor data. For example, secondary hyperspectral data can be obtained and, by using the generated factor matrices, the secondary hyperspectral data can be compressed into a core tensor. In some cases, a compression ratio of 600 to 1 or greater from the uncompressed secondary hyperspectral data to the compressed core tensor can be realized.

In the example of FIG. 1, the feature extraction model 118 includes the decomposition engine 119. In some implementations, the decomposition engine 119 performs one or more decomposition operations on the centered and normalized hyperspectral data 117. For example, the decomposition engine 119 can perform one or more partial singular value decompositions (SVD) on the centered and normalized hyperspectral data 117. In some implementations, the decomposition operations are partial in that the decomposition engine 119 only selects the eigenvectors that correspond to a first number of the largest eigenvalues. For example, the decomposition engine 119 can obtain a predetermined number representing the desired dimensions of a final form of compressed tensor data such as 16 or any number chosen by a user or automated process.

In the example of FIG. 1, the decomposition engine 119 iteratively applies a decomposition process such as SVD based on one or more eigenvalues of the centered and normalized hyperspectral data 117. In some implementations, the decomposition engine 119 generates a tensor corresponding to eigenvectors of the centered and normalized hyperspectral data 117. Output of the decomposition engine 119 such as a tensor can then be processed by the local optimization engine 120 to generate one or more factor matrices.

In some implementations, the local optimization engine 120 maximizes tensor-based scatter. For example, the local optimization engine 120 can obtain output of the decomposition engine 119 corresponding to one or more eigenvectors of the centered and normalized hyperspectral data 117 and compute the value of a corresponding function representing the tensor-based scatter. In some implementations, the function can include computing a summation such as $\Sigma_{m=1}^{M}\|y_m - \bar{y}\|_F^2$ where $$\bar{y} = \frac{1}{M}\sum_{m=1}^{M} y_m.$$

The feature extraction model 118 including the decomposition engine 119 and the local optimization engine 120 generate a number of factor matrices based on the centered and normalized hyperspectral data 117. In some implementations, the generation of each factor matrix is iterative. For example, the decomposition engine 119 can perform decomposition operations on the centered and normalized hyperspectral data 117 and the local optimization engine 120 can check the resulting matrices for a check condition. If the resulting matrices do not meet the check condition, the feature extraction model 118 iterative process can continue until the check condition is satisfied. In some implementations, satisfying the check condition includes reaching a predetermined number of iterations or generating a computed value of the resulting matrices that satisfies a predetermined value condition. For example, the local optimization engine 120 can check for a minimization of the Euclidean norm of the difference between an original tensor corresponding to the centered and normalized hyperspectral data 117 and a reconstructed tensor such as a tensor reconstructed using one or more resulting factor matrices.

Each object of the objects 104 represented in the centered and normalized hyperspectral data 117 is processed by the feature extraction model 118 including the decomposition engine 119 and the local optimization engine 120. In some implementations, identifiers such as index values or the like are used to track individual objects of the objects 104. By processing each object of the objects 104, the feature extraction model 118 including the decomposition engine 119 and the local optimization engine 120 is trained to produce the factor matrices 122 based on the objects 104 represented in the centered and normalized hyperspectral data 117.

In some implementations, the feature extraction model 118 performs operations consistent with a Tucker decomposition. For example, the feature extraction model 118 can determine, based on input data of the centered and normalized hyperspectral data 117, to perform a Tucker decomposition in order to generate a core tensor and a set of matrices representing one or more modes of the core tensor. The original tensor data of the centered and normalized hyperspectral data 117 can be recomputed based on the generated core tensor and the set of matrices. For example, the transpose of the set of matrices can be computed and a product of the transpose of the set of matrices and the core tensor can be used to generate the original tensor data of the centered and normalized hyperspectral data 117.

In the example of FIG. 1, the feature extraction model 118 including the decomposition engine 119 and the local optimization engine 120 generates the factor matrices 122 including factor matrix A, factor matrix B, and factor matrix C. In some implementations, the factor matrices 122 correspond to the dimension of an object of the objects 104 in the centered and normalized hyperspectral data 117. For example, as shown in item 114, the modes of the hyperspectral data 111 that correspond to a given object are 145 pixels by 120 pixels by 160 where 160 represents 160 wavelength-based intensity images each of which include a 145 by 120 portion of the object shown in item 114. As discussed, other modes or dimensions can be used to depict one or more objects using hyperspectral data.

The factor matrices 122 have dimensions of 145 by 16, 120 by 16, and 160 by 16 that when combined using a dot product or other operation with an original tensor image of 145 pixels by 120 pixels by 160 produce a core tensor of 16 by 16 by 16 that contains, in some cases, over 90% of the variance and over 70% accuracy compared to the original tensor image of 145 pixels by 120 pixels by 160. In some cases, the core tensor requires less than 0.25% of the data storage required for the original tensor image of 145 pixels by 120 pixels by 160 but, because of the relevant data captured by the feature extraction model 118, this compressed data can still be useful for analysis and other processes.

In some implementations, the feature extraction model 118 can use a gradient descent algorithm to learn the factor matrices 122. For example, the feature extraction model 118 can compute a gradient corresponding to the error with respect to parameters of the feature extraction model 118. The error can be computed based on the difference between a prediction of the feature extraction model 118 and a known label corresponding to input data such as the normalized hyperspectral data 117.

In some implementations, factor matrices generated by the feature extraction model 118 compress unfolded multi-dimensional matrices corresponding to the hyperspectral data 117. In general, the feature extraction model 118 is able to process data with any number of modes. In the example of FIG. 1, the hyperspectral data 117 includes three modes: height (H), width (W), and spectral range (S). For example, the hyperspectral data 117 can include a number of samples that each include images representing different spectral ranges and that correspond to particular heights and widths. In this example, generated factor matrices can be used to compress unfolded multi-dimensional matrices corresponding to the three modes, H, W, and S, of the hyperspectral data 117.

For example, a first mode of the hyperspectral data 117, such as height, can be unfolded into an element of a tensor by obtaining every height element for a given sample at a given width and a given spectral range. Another element of the tensor can be generated by obtaining every height element for another sample at a second given width and a second given spectral range. This can be repeated for all available samples, all available widths, and all available spectral ranges until the tensor is complete. The tensor in this case would be the unfolded tensor corresponding to the height mode. In some implementations, other modes are unfolded in the same way to generate unfolded tensors.

In some implementations, the feature extraction model 118 generates factor matrices that, when multiplied by unfolded tensors, generate compressed matrices. For example, in the previous example, the unfolded tensor corresponding to the height mode is generated. To compress the unfolded tensor corresponding to the height mode, the feature extraction model 118 can generate a factor matrix corresponding to the height mode with dimensions to enable multiplication. For example, if a first mode of the unfolded tensor is of dimension N multiplied by W multiplied by S and a second mode of the unfolded tensor is of dimension H, the factor matrix corresponding to the height mode can be of the dimensions H by H_C where H_C is a dimension of the second mode of the resulting compressed matrix and the desired height dimension of the resulting compressed core.

In some implementations, modes of the hyperspectral data 117 are unfolded sequentially with compression occurring between iterations of unfolding. For example, as discussed, the height mode of the hyperspectral data 117 can be unfolded to generate an unfolded tensor. The unfolded tensor can be multiplied by a factor matrix to generate a compressed version of the unfolded tensor. The compressed version of the unfolded tensor can then be re-folded on the height mode to generate a final compressed version. The remaining modes of the hyperspectral data 117 can similarly be unfolded and re-folded to generate compression along each of the remaining modes until the hyperspectral data 117 is fully compressed.

In some implementations, a fully compressed version of the hyperspectral data 117 is generated based on a number of factor matrices iteratively learned by the feature extraction model 118. For example, in the example of the hyperspectral data 117 with three modes, H, W, and S, three factor matrices corresponding to each of the three modes, H, W, and S, can be generated to compress the hyperspectral data 117 along each mode of the hyperspectral data 117. The three factor matrices can then be adjusted based on the result of a loss function that compares the compressed version of the hyperspectral data 117 with the hyperspectral data 117. In some implementations, a gradient descent algorithm is used to find the minima of the loss function and thus the compressed version of the hyperspectral data 117 that, when reconstructed, represents the most accurate approximation of the original hyperspectral data 117 or the most representative in terms of retaining key features within the original hyperspectral data 117. For example, the factor matrices corresponding to the one or more modes of the hyperspectral data can be adjusted to generate alternate compressed versions of the hyperspectral data 117. Based on the loss function, the factor matrices are adjusted to minimize the difference generated by the loss function. In a similar way, other gradient methods, such as gradient ascent algorithms, may be used.

In some implementations, the loss function is generated based on an ability to compute accurate reconstructions based on the compressed version of the hyperspectral data 117. A high value of the loss function can be configured to represent a high likelihood of inaccurate predictions when using the compressed version of the hyperspectral data 117 whereas a low value of the loss function can be configured to represent a low likelihood of inaccurate predictions. For example, the loss function can be generated after using the compressed version of the hyperspectral data 117, or a calculated value associated with the compressed version of the hyperspectral data 117, such as a decompressed version of the compressed hyperspectral data 117, to predict various features, such as firmness, dry matter, treated versus untreated, and the like. In general, any applicable feature can be calculated and included in a computation of the loss function. Based on known features of the objects 104, a loss function can include a measure of difference between the features detected based on the compressed version of the hyperspectral data 117 and the known features of the objects 104. In some implementations, known features of the objects 104 can be included in the hyperspectral data 117 as labels to inform the loss function and training of the feature extraction model 118.

In some implementations, the loss function used in training the feature extraction model 118 is defined as a mathematical function. For example, the loss function used in training the feature extraction model 118 can be defined as the two norm of the difference between the original tensor representing the hyperspectral data 117 and the reconstructed tensor that is reconstructed based on the compressed version of the hyperspectral data 117. Mathematically, a corresponding loss function can be expressed as, $\|T-T_r\|_2$, where T corresponds to the original tensor representing the hyperspectral data 117 and $T_r$ corresponds to the reconstructed tensor that is reconstructed based on the compressed version of the hyperspectral data 117. As described herein, the compressed version of the hyperspectral data 117 can be generated by iteratively compressing along each mode of the tensor corresponding to the hyperspectral data 117 by using the generated factor matrices. The reconstructed tensor can be generated by iteratively decompressing along each mode of the compressed version of the hyperspectral data 117 by using a transposition of the same generated factor matrices.

In stage E, the factor matrices 122 are generated as part of output 124. The output 124 can be sent to other processes or systems or can be stored in a data storage device. The output 124 and the included factor matrices 122 can then be used for compression and decompression of other hyperspectral data of objects similar to the objects 104.

Figure 2:
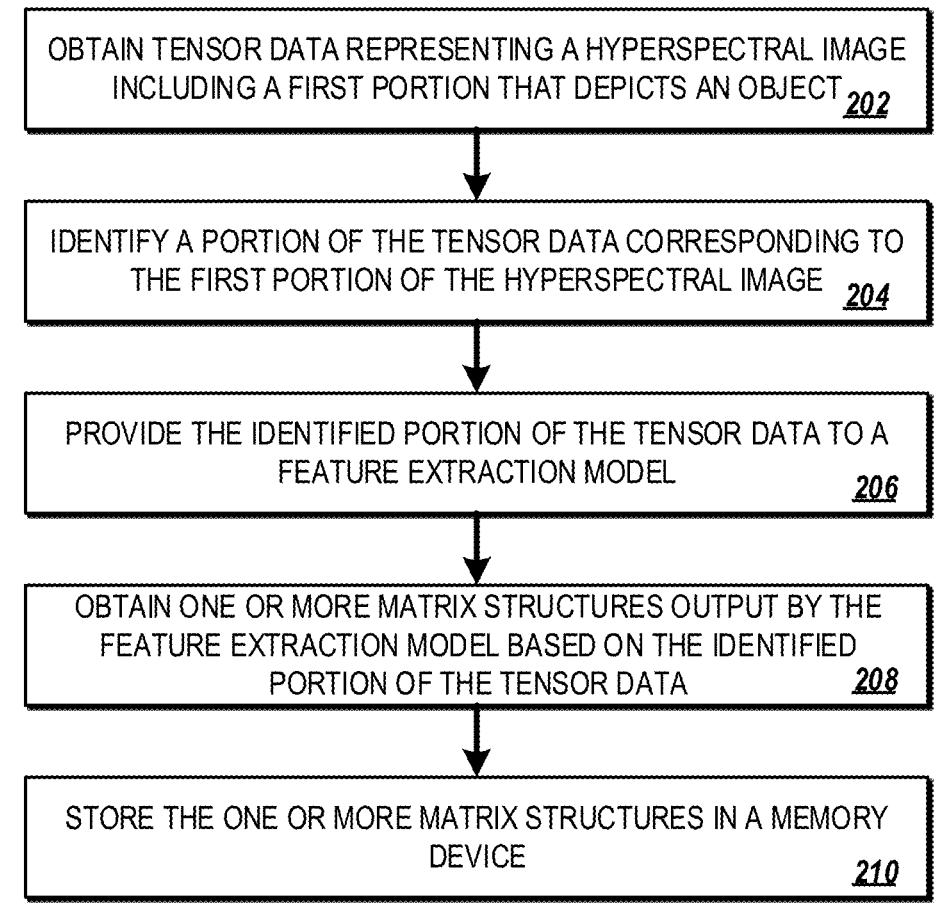
FIG. 2 is a flow diagram illustrating an example of a method for factor matrix generation for machine learning based compression for hyperspectral images.

FIG. 2 is a flow diagram illustrating an example of a method 200 for factor matrix generation for machine learning based compression for hyperspectral images. The method 200 can be performed by one or more systems or devices such as the system 100 of FIG. 1.

The method 200 includes obtaining tensor data representing a hyperspectral image including a first portion that depicts an object (202). For example, as shown in FIG. 1, the object detection engine 110 of the system 100 obtains the initial hyperspectral data 105. The initial hyperspectral data 105 can depict at least a portion of a surrounding environment where the objects 104 are located such as the surface of a conveyer belt or bottom of a container. The object detection engine 110 determines at least a portion of the initial hyperspectral data 105 that depicts an object of the objects 104 and not the surrounding environment where the objects 104 are located and determines a boundary between each object of the objects 104 and the surrounding environment.

The method 200 includes identifying a portion of the tensor data corresponding to the first portion of the hyperspectral image (204). For example, the object detection engine 110 determines at least a portion of the initial hyperspectral data 105 that depicts an object of the objects 104 and not the surrounding environment. The at least a portion of the initial hyperspectral data 105 that depicts an object of the objects 104 and not the surrounding environment corresponds to a portion of tensor data corresponding to the portion of the initial hyperspectral data 105 that depicts an object of the objects 104 and not the surrounding environment. In this example, the initial hyperspectral data 105 is a tensor that includes one or more portions of tensor data that correspond to individual objects of the objects 104.

The method 200 includes providing the identified portion of the tensor data to a feature extraction model (206). For example, the feature extraction model 118 including the decomposition engine 119 and the local optimization engine 120 obtains the centered and normalized hyperspectral data 117. The centered and normalized hyperspectral data 117 can include the portion of tensor data corresponding to an individual object of the objects 104. The tensor data corresponding the individual object of the objects 104 can be processed by the feature extraction model 118 including the decomposition engine 119 and the local optimization engine 120. The same or similar processing can take place on other tensor data of the centered and normalized hyperspectral data 117 corresponding to other objects of the objects 104.

The method 200 includes obtaining one or more matrix structures output by the feature extraction model based on the identified portion of the tensor data (208). For example, the feature extraction model 118 including the decomposition engine 119 and the local optimization engine 120 can perform operations consistent with machine learning methods such as MSL algorithms or the like to generate the factor matrices 122 corresponding to the tensor data of the centered and normalized hyperspectral data 117 corresponding the individual object of the objects 104 as well as other tensor data of the centered and normalized hyperspectral data 117 corresponding to other objects of the objects 104. In some implementations, a form of Tucker decomposition is applied to generate the factor matrices 122. For example, the factor matrices 122 can be generated based on iteratively computing one or more partial SVDs of the tensor data of the centered and normalized hyperspectral data 117 corresponding the individual object of the objects 104 until a number of iterations has been reached or the Euclidean norm of the difference between the tensor data and a compressed or core tensor corresponding to the tensor after the generated factor matrices 122 have been applied is minimized.

The method 200 includes storing the one or more matrix structures in a memory device (210). For example, the system 100 can generate the factor matrices 122 as a representation of binary values on a computer system. The representation of binary values representing the factor matrices 122 can be saved in memory storage. In some implementations, another process or system obtains the factor matrices 122. For example, instead of storing the factor matrices 122, another system or the system 100 can obtain the factor matrices 122 and directly use the factor matrices 122 for compression or decompression of hyperspectral data or anther process.

In some implementations, the feature extraction model 118 including the decomposition engine 119 and the local optimization engine 120 receives a less processed version of the initial hyperspectral data 105. For example, instead of detecting the objects or instead of centering and normalizing before generating the matrices, the feature extraction model

118 can simply obtain the initial hyperspectral data 105 and compute resulting factor matrices based on the initial hyperspectral data 105.

Figure 3:
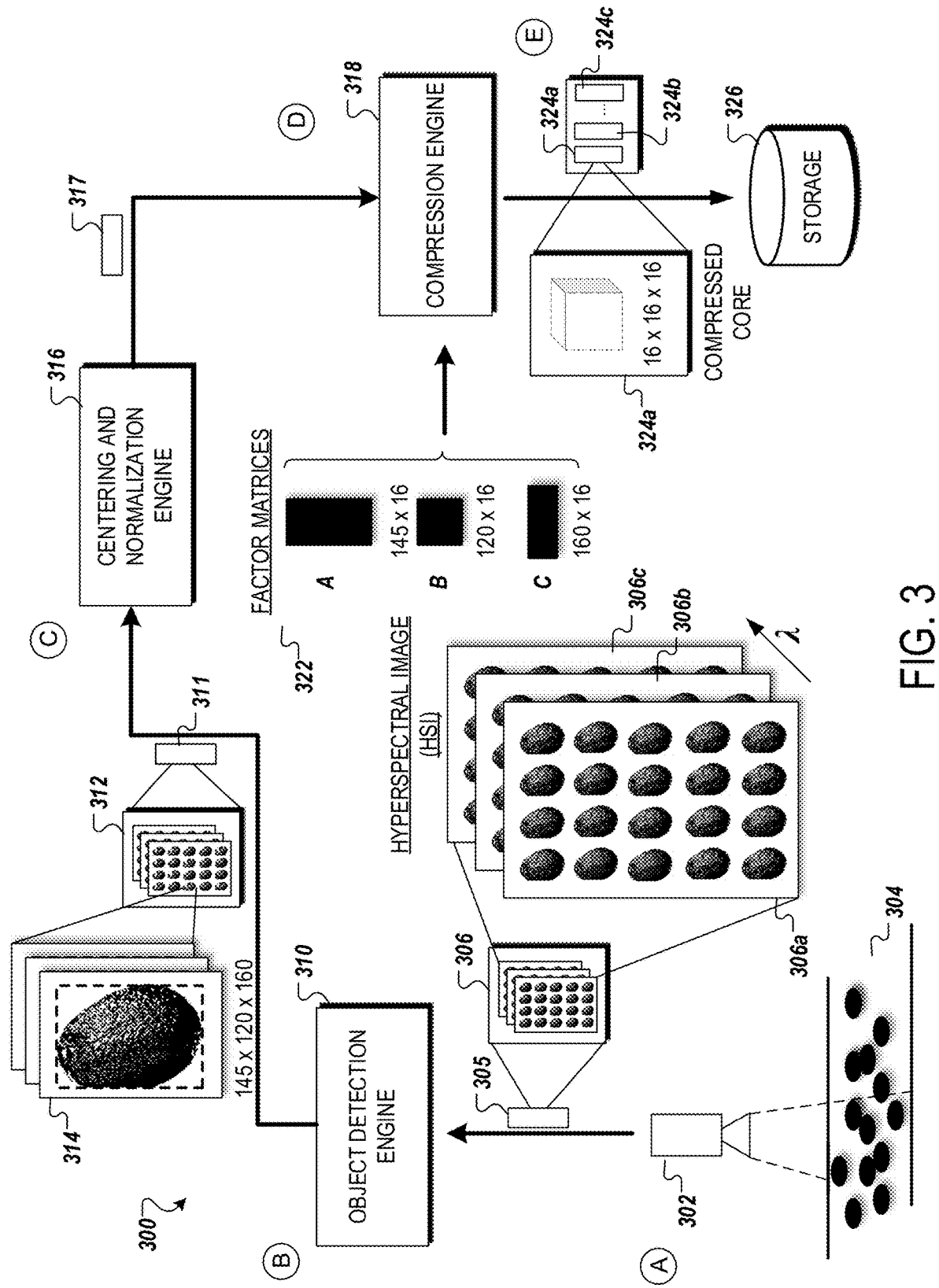
FIG. 3 is a diagram showing an example of a system for hyperspectral image compression using generated factor matrices.

FIG. 3 is a diagram showing an example of a system 300 for hyperspectral image compression using generated factor matrices. The system 300 is similar to the system 100 in that both the system 300 and the system 100 include hyperspectral image sensor, object detection engine, and centering and normalization engine. However, the system 100 provides an example of generating the factor matrices 122 where the system 300 provides an example of using factor matrices, such as the factor matrices 122 to compress hyperspectral data. In some implementations, entities of the system 100 can be used to perform operations of the system 300 and vice versa.

The system 300 includes a hyperspectral image sensor 302 similar to the hyperspectral image sensor 102, an object detection engine 310 similar to the object detection engine 110, and a centering and normalization engine 316 similar to the centering and normalization engine 116. The system 300 further includes a compression engine 318 that obtains factor matrices 322 and centered and normalized hyperspectral data 317 and generates one or more compressed cores corresponding to each object represented in the centered and normalized hyperspectral data 317.

Stages A through C of FIG. 3 are similar to stages A through C of FIG. 1. For a detailed discussion of the corresponding process, reference should be made to the corresponding stages of FIG. 1 described in this specification.

In stage D of FIG. 3, the compression engine 318 obtains the centered and normalized hyperspectral data 317. The centered and normalized hyperspectral data 317, similar to the centered and normalized hyperspectral data 117 of FIG. 1, includes multiple portions of tensor data corresponding to each object of the objects 304. The compression engine 318 also obtains the factor matrices 322 that are generated beforehand using hyperspectral data and processes similar to the process shown in FIG. 1 and described in the method 200 of FIG. 2. For example, the factor matrices 322 can be generated using a process of MSL such as the Tucker decomposition.

The compression engine 318 uses the factor matrices 322 and the centered and normalized hyperspectral data 317 to generate one or more compressed cores corresponding to each object represented in the centered and normalized hyperspectral data 317. In some implementations, the compression engine 318 performs matrix multiplication using the factor matrices 322 to generate the one or more compressed cores. For example, the compression engine 318 can perform an n-mode dot product on a first tensor corresponding to a first object represented in the centered and normalized hyperspectral data 317.

In the example of FIG. 3, the factor matrices 322 are of the dimensions 145 by 16, 120 by 16, and 160 by 16. As discussed in this specification, other dimensions can be used depending on system requirements or defined system parameters. In general, any dimension or number of factor matrices can be used. The centered and normalized hyperspectral data 317 includes multiple portions of tensor data corresponding to each object of the objects 304. The multiple portions of tensor data are each compressed into a compressed core. In some implementations, matrix multiplication is used by the compression engine 318 to generate compression cores. For example, the compression engine 318 can generate a compressed core 324a for a first object represented in the centered and normalized hyperspectral data 317 by multiplying the tensor data of the centered and normalized hyperspectral data 317 corresponding to the first object by the factor matrices 322. In particular, the compression engine 318 can calculate a tensor product of the tensor data of the centered and normalized hyperspectral data 317 corresponding to the first object with the factor matrices 322.

In some implementations, two or more objects of the centered and normalized hyperspectral data 317 are combined within a single compressed core. For example, instead of computing a compressed core corresponding to a single object represented in the centered and normalized hyperspectral data 317, the compression engine 318 can combine multiple objects into a single compressed core. In some cases, the process of combining multiple objects helps reduce data storage use or number of compressed core data items.

In the example of FIG. 3, the compression engine 318 computes compressed cores 324a, 324b, and 324c. For ease of illustration, only three computed compressed cores are shown, however, the compression engine 318 can compute as many compressed cores as objects represented in the centered and normalized hyperspectral data 317. For example, if the objects 304 included 100 objects and the centered and normalized hyperspectral data 317 represented those 100 objects as shown similar to item 314, the compression engine 318 can compute 100 compressed cores corresponding to the 100 objects of the objects 304.

The factor matrices 322 of FIG. 3 are of a certain dimension, e.g., 145 by 16, 120 by 16, and 160 by 16, and can be used to produce the output compressed core of size 16 by 16 by 16. In some implementations, the output compressed core size is a function of the size of the tensor data corresponding to a given object of the centered and normalized hyperspectral data 317 and the size of the factor matrices 322. For example, the compressed core 324a can be generated based on a tensor product of the factor matrices 322 of size 145 by 16, 120 by 16, and 160 by 16 with the tensor data corresponding to a given object of size 145 by 120 by 160. A resulting tensor product calculation results in a compressed core size of 16 by 16 by 16.

In some implementations, other factor matrices are used to generate compressed cores of other dimensions. For example, the compression engine 318 or another entity of the system 300 can obtain a predetermined compressed core size. The predetermined compressed core size can include criteria of the size and other characteristics of the specific compressed core to be generated. The compression engine 318 can use the predetermined compressed core size to generate compressed cores of specific size or characteristics.

In stage E of FIG. 3, the compressed cores 324a, 324b, and 324c correspond to multiple tensor data portions of the centered and normalized hyperspectral data 317 corresponding to multiple objects of the objects 304. The system 300 can obtain generated compressed cores including the compressed cores 324a, 324b, and 324c and store the compressed cores 324a, 324b, and 324c in storage 326 where the storage 326 is able to hold data representative of the compressed cores 324a, 324b, and 324c for later retrieval and processing. In some implementations, storage 326 is a form of binary storage system with elements of the storage 326 representing binary bits corresponding to the compressed cores 324a, 324b, and 324c.

In some implementations, the compressed cores 324a, 324b, and 324c are used for subsequent processes. For example, instead of being stored, the compressed cores 324a, 324b, and 324c can be sent to another entity or processor for subsequent processing or storage.

FIG. 4 is a flow diagram illustrating an example of a method 400 for hyperspectral image compression using generated factor matrices. The method 400 can be implemented by one or more computer systems including the system 300 of FIG. 3 or the system 100 of FIG. 1.

The method 400 includes obtaining tensor data representing a hyperspectral image including a first portion that depicts an object (402). For example, as shown in FIG. 3 and similar to method 200, the object detection engine 310 of the system 300 obtains initial hyperspectral data 305. The initial hyperspectral data 305 can depict at least a portion of a surrounding environment where the objects 304 are located such as the surface of a conveyer belt or bottom of a container. The object detection engine 310 determines at least a portion of the initial hyperspectral data 305 that depicts an object of the objects 304 and not the surrounding environment where the objects 304 are located and determines a boundary between each object of the objects 304 and the surrounding environment.

The method 400 includes identifying a portion of the tensor data corresponding to the first portion of the hyperspectral image (404). For example, similar to method 200, the object detection engine 310 determines at least a portion of the initial hyperspectral data 305 that depicts an object of the objects 304 and not the surrounding environment. The at least a portion of the initial hyperspectral data 305 that depicts an object of the objects 304 and not the surrounding environment corresponds to a portion of tensor data corresponding to the portion of the initial hyperspectral data 305 that depicts an object of the objects 304 and not the surrounding environment. In this example, the initial hyperspectral data 305 is a tensor that includes one or more portions of tensor data that correspond to individual objects of the objects 304.

The method 400 includes providing the identified portion of the tensor data and one or more matrix structures output by a feature extraction model to a compression engine (406). For example, the compression engine 318 can obtain the centered and normalized hyperspectral data 317 including a first portion that depicts a particular object in tensor data of the centered and normalized hyperspectral data 317. The compression engine 318 can also obtain matrix structures such as the factor matrices 322. In some implementations, the factor matrices 322 are generated similar to the factor matrices 122 of FIG. 1 and the method 200 of FIG. 2. For example, the system 100 can generate the factor matrices 122 and send the factor matrices to a compression engine such as the compression engine 318.

The method 400 includes obtaining a core matrix structure output by the compression engine based on the identified portion of the tensor data (408). For example, the compression engine 318 can compute a tensor product based on at least the first portion of tensor data included in the centered and normalized hyperspectral data 317 representing a first object of the objects 304 and the factor matrices 322 representing output of a trained model such as a Tucker decomposition model.

The method 400 includes storing the core matrix structure in a memory device (410). For example, the system 300 can obtain generated compressed cores including the compressed cores 324a, 324b, and 324c and store the compressed cores 324a, 324b, and 324c in the storage 326 where the storage 326 is able to hold data representative of the compressed cores 324a, 324b, and 324c for later retrieval and processing. In some implementations, storage 326 is a form of binary storage system with elements of the storage 326 representing binary bits corresponding to the compressed cores 324a, 324b, and 324c.

Figure 5:
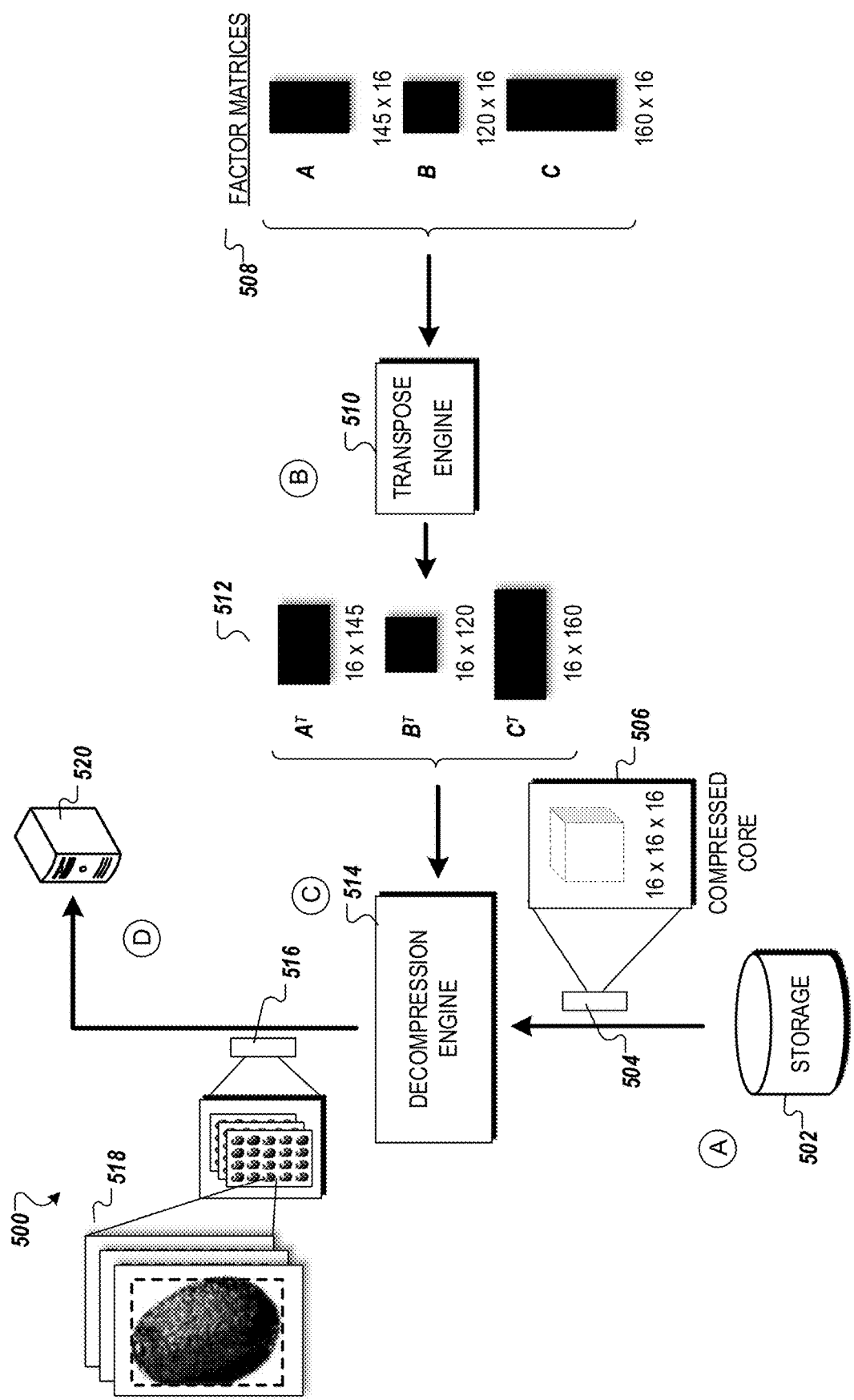
FIG. 5 is a diagram showing an example of a system for hyperspectral image decompression using generated factor matrices.

FIG. 5 is a diagram showing an example of a system 500 for hyperspectral image decompression using generated factor matrices. The system 500 includes storage 502 that is used to store compressed cores including a compressed core 506, a transpose engine 510 that transposes obtained factor matrices 508, a decompression engine 514 that uses the compressed core 506 and transposed factor matrices 512 to generate tensor data, and a second system 520 that, in some implementations, can receive tensor data generated by the system 500.

In some implementations, the system 500 is used in order to reconstruct tensor data from compressed tensor data. For example, as discussed in reference to FIG. 3, the system 300 can be used to compress tensor data into a compressed core. The compressed core can be stored using less data storage than the original tensor data used to generate the compressed core thus saving valuable data storage resources. Before being processed for analysis or other purposes, the compressed core data stored in data storage can be reconstructed using the system 500 as shown in FIG. 5. The system 500 can generate reconstructed images of objects, such as the objects 304 or the objects 104, based on corresponding compressed cores and factor matrices used to generate the compressed cores.

In some implementations, the system 100, the system 300, and the system 500 are interconnected. For example, the system 300 can include entities described in the system 100 such as the object detection engine 110. A single system can generate the factor matrices as described in FIG. 1 and the system 100, compress hyperspectral data for storage as described in FIG. 3 and the system 300, and decompress the hyperspectral data for further processes or analysis as described in FIG. 5 and system 500.

In stage A of FIG. 5, storage 502 that includes the compressed core 506 is identified. The decompression engine 514 obtains data 504 representing the compressed core 506 from the storage 502. The storage 502 can be the same or similar to the storage 326 of FIG. 3. In some implementations, the compressed core is obtained from another system over a wired or wireless connection or other communication channel. For example, a first compression system, such as the system 300 of FIG. 3 can send a compression core to the system 500. The compression core can be obtained by the decompression engine 514 of the system 500 for subsequent decompression.

In stage B of FIG. 5, factor matrices 508 are obtained by the system 500. In some implementations, the factor matrices 508 are also obtained from storage. For example, the factor matrices 508 can be obtained from the storage 502 or another storage device. The transpose engine 510 obtains the factor matrices 508 and transposes the factor matrices 508 to generate transposed factor matrices 512. In some implementations, the factor matrices 508 are generated by the system 100 or a similar process such as a trained Tucker decomposition model.

In stage C of FIG. 5, the transposed factor matrices 512 are obtained by the decompression engine 514. The decompression engine 514 uses the transposed factor matrices 512 and the compressed core 506 to generate reconstructed tensor data 516. In the example of FIG. 5, the compressed core 506 represents hyperspectral data of an avocado. In general, any object can be represented by the compressed core 506.

The decompression engine 514 performs matrix calculation using the transposed factor matrices 512 and the compressed core 506. For example, the decompression engine 514 can calculate a tensor product of the transposed factor matrices 512 and the compressed core 506. The resulting output of the tensor product calculation can be used to generate the reconstructed tensor data 516.

In stage D of FIG. 5, the reconstructed tensor data 516 is sent from the decompression engine 514 to the second system 520. The reconstructed tensor data 516 includes a reconstructed hyperspectral image portion 518 that depicts a portion of an avocado. In other implementations, other items other than an avocado may be depicted in the reconstructed hyperspectral image portion 518. The second system 520 can perform subsequent processing such as actively sorting objects based at least on the reconstructed tensor data 516. In some implementations, the system 500 internally processes the reconstructed tensor data 516. For example, instead of sending the reconstructed tensor data 516 to the second system 520, the system 500 can perform an operation on the reconstructed tensor data 516 such as calculate an inference of an object depicted in the reconstructed tensor data 516 based on one or more learned features. In some cases, the inference is related to the condition of the object such as ripeness.

In some implementations, the reconstructed tensor data 516 is used to actively sort one or more objects. For example, the objects 304 can be moving along a conveyer belt such that the hyperspectral image sensor 302 captures the initial hyperspectral data 305 as the objects 304 move along the conveyer belt. The initial hyperspectral data 305 can be compressed to generate the compressed cores 324a, 324b, and 324c. Either before or after compression, a system, such as the systems discussed herein or a different system, can sort or categorize the objects 304 based on the initial hyperspectral data 305 or a reconstructed version of the compressed cores 324a, 324b, and 324c. In some implementations, the compressed cores 324a, 324b, and 324c are reconstructed in a process similar to the stages of FIG. 5. In some implementations, the initial hyperspectral data 305 is first used to perform an action on the objects 304 and then compressed for storage to inform subsequent analysis or processes.

In some implementations, the objects 304 travel on a conveyer belt and the system 300 is connected with one or more actuators. For example, the conveyer belt can move the objects 304 past the hyperspectral image sensor 302 such that the hyperspectral image sensor 302 obtains the initial hyperspectral data 305. The initial hyperspectral data 305 can then be used by the system 300 to determine a condition or classification for one or more objects of the objects 304. Based on the determined condition or classification for one or more objects of the objects 304, the system 300 can actuate the one or more actuators in order to sort or direct the one or more objects from one location to another location. For example, a splitting actuator can be implemented along a conveyer belt carrying the objects 304. Based on the determined condition or classification for one or more objects of the objects 304, the system can actuate the splitting actuator to force the one or more objects moving along the conveyer belt from one location to another location, in some cases by changing an initial vector of motion to a subsequent vector of motion that is different from the initial vector of motion.

Figure 6:
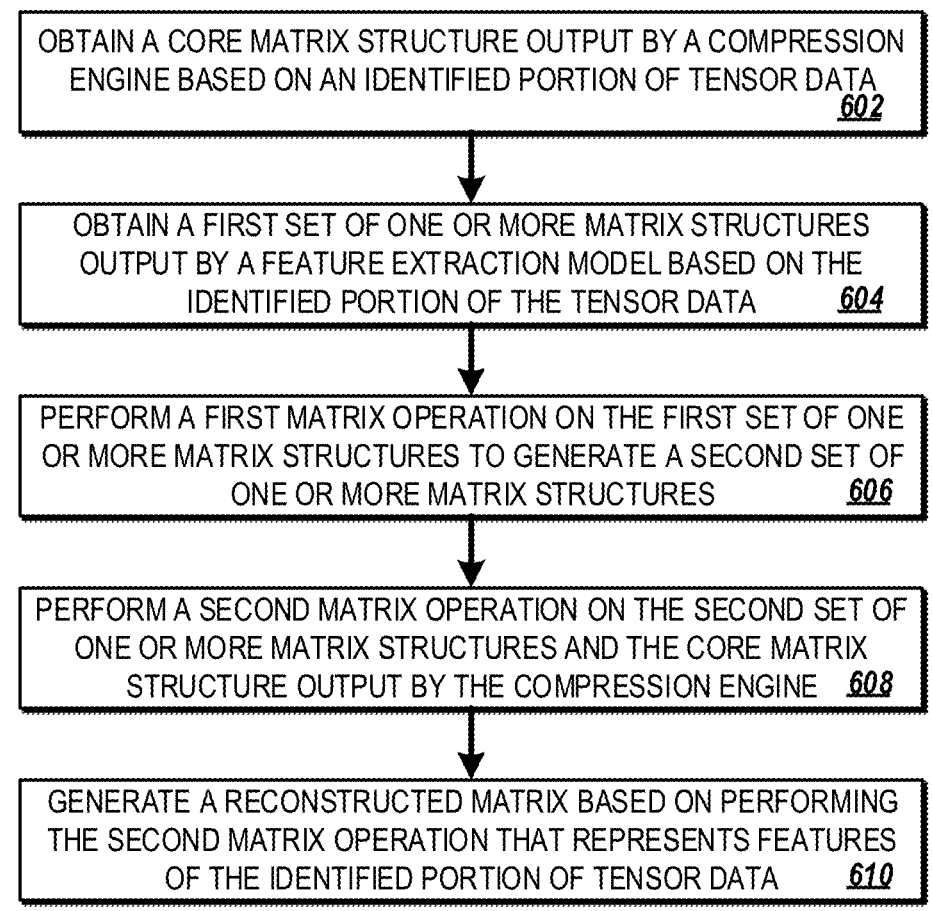
FIG. 6 is a flow diagram illustrating an example of a method for hyperspectral image decompression using generated factor matrices.

FIG. 6 is a flow diagram illustrating an example of a method 600 for hyperspectral image decompression using generated factor matrices. The method 600 can be performed by one or more computer systems such as the system 500 of FIG. 5, the system 300 of FIG. 3, or the system 100 of FIG. 1.

The method 600 includes obtaining a core matrix structure output by a compression engine based on an identified portion of tensor data (602). For example, the decompression engine 514 obtains the compressed core 506 from the storage 502. The storage 502 can be the same or similar to the storage 326 of FIG. 3. In some implementations, the compressed core is obtained from another system over a wired or wireless connection or other communication channel. For example, a first compression system, such as the system 300 of FIG. 3 can send a compression core to the system 500. The compression core can be obtained by the decompression engine 514 of the system 500 for subsequent decompression.

The method 600 includes obtaining a first set of one or more matrix structures output by a feature extraction model based on the identified portion of the tensor data (604). For example, the factor matrices 508 can be obtained from the storage 502 or another storage device. The factor matrices can be generated by the system 100 within factor matrices generation or a similar process that includes one or more models such as a trained Tucker decomposition model to generate factor matrices.

The method 600 includes performing a first matrix operation on the first set of one or more matrix structures to generate a second set of one or more matrix structures (606). For example, the first matric operation can include transposition operations performed by the transpose engine 510. The transpose engine 510 can obtain the factor matrices 508 and transpose the factor matrices 508 to generate transposed factor matrices 512.

The method 600 includes performing a second matrix operation on the second set of one or more matrix structures and the core matrix structure output by the compression engine (608). For example, the decompression engine 514 can calculate a tensor product of the transposed factor matrices 512 and the compressed core 506. The resulting output of the tensor product calculation can be used to generate the reconstructed tensor data 516.

The method 600 includes generating a reconstructed matrix based on performing the second matrix operation that represents features of the identified portion of tensor data (610). For example, the decompression engine 514 can use the transposed factor matrices 512 and the compressed core 506 to generate reconstructed tensor data 516. In some implementations, the reconstructed tensor data 516 represents features of at least a portion of hyperspectral data stored as tensor data. For example, a portion of hyperspectral data stored as tensor data can be compressed as shown in FIG. 3. A subsequent decompression operation can be performed, as shown in FIG. 5, to generate reconstructed tensor data that includes at least a set of features common with the portion of hyperspectral data stored as tensor data that was initially compressed. In this way, the decompression method generates reconstructed data that is similar to the tensor data, such as hyperspectral tensor data, initially used to generate the compressed core used for reconstruction.

FIG. 7 is a diagram illustrating an example of a computing system used for processing hyperspectral image data. The computing system includes computing device 700 and a mobile computing device 750 that can be used to implement the techniques described herein. For example, one or more components of the system 100 could be an example of the computing device 700 or the mobile computing device 750, such as a computer system implementing the feature extraction model 118, devices that access information from the feature extraction model 118, or a server that accesses or stores information regarding the operations performed by the feature extraction model 118.

As another example, one or more components of the system 300 could be an example of the computing device 700 or the mobile computing device 750, such as a computer system implementing the compression engine 318, devices that access information from the compression engine 318, or a server that accesses or stores information regarding the operations performed by the compression engine 318.

As yet another example, one or more components of the system 500 could be an example of the computing device 700 or the mobile computing device 750, such as a computer system implementing the decompression engine 514, devices that access information from the decompression engine 514, or a server that accesses or stores information regarding the operations performed by the decompression engine 514.

The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 702 is a single threaded processor. In some implementations, the processor 702 is a multi-threaded processor. In some implementations, the processor 702 is a quantum computer.

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine readable mediums (for example, the memory 704, the storage device 706, or memory on the processor 702). The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device, such as a mobile computing device 750. Each of such devices may include one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry in some cases. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 768 using a radio frequency. In addition, short-range communication may occur, such as using a Bluetooth, Wi-Fi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, among others) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method for reducing an amount of memory required to store hyperspectral images of an object, the method comprising:
obtaining, by one or more computers, tensor data representing a hyperspectral image, wherein the hyperspectral image includes a first portion that depicts an object and a second portion that depicts at least a portion of a surrounding environment where the object is located, wherein the object is a first type, and wherein the hyperspectral image captures data within a wavelength range, and wherein the data within the wavelength range is usable for inferencing conditions of objects of the first type;
identifying, by the one or more computers, a portion of the tensor data representing the hyperspectral image that corresponds to the first portion of the hyperspectral image;
providing, by the one or more computers, the identified portion of the tensor data representing the hyperspectral image as an input to a feature extraction model, wherein the feature extraction model was trained using a training dataset to process portions of tensor data of other hyperspectral images to determine one or more matrix structures associated with the other hyperspectral images;

obtaining, by the one or more computers, the one or more matrix structures as output from the feature extraction model, wherein the one or more matrix structures represent a subset of features extracted from the identified portion of the tensor data representing the hyperspectral image, and wherein the subset of the features extracted from the identified portion comprises distinguishing features usable to inference a current condition of the object; and storing, by the one or more computers, the one or more matrix structures in a memory device.

2. The method of claim 1, wherein the object depicted by the hyperspectral image is a food item, the food item being at least one of a citrus fruit, an avocado, a mango, an apple, a berry, a stone fruit, a tomato, meat, or a vegetable.

3. The method of claim 1, further comprising receiving, by the one or more computers from a hyperspectral sensor, the hyperspectral image, wherein the hyperspectral sensor is configured to detect light waves having the wavelength range, wherein the hyperspectral sensor is configured to automatically select the wavelength range in response to identifying the type of the object, and wherein the wavelength range is between approximately 520 nm to 950 nm.

4. The method of claim 1, the method further comprising:
normalizing, by the one or more computers, the identified portion of the tensor data representing the hyperspectral image, and
wherein providing, by the one or more computers, the identified portion of the tensor data representing the hyperspectral image as an input to the feature extraction model comprises providing the normalized portion of the tensor data as the input to the feature extraction model.

5. The method of claim 1, wherein the feature extraction model is an unsupervised learning model.

6. The method of claim 1, wherein the feature extraction model is a supervised learning model.

7. The method of claim 1, wherein the feature extraction model is a multilinear principal component analysis model having one or more user defined parameters defining one or more matrix structures to be produced based on processing, by the feature extraction model, the portion of the tensor data representing the hyperspectral image, wherein the one or more user defined parameters include a height and a width of each matrix structure of the one or more matrix structures.

8. The method of claim 1, wherein at least one of the one or more matrix structures include data that represents a spectral domain of the hyperspectral image.

9. The method of claim 1, further comprising:
providing, by the one or more computers, (i) the identified portion of the tensor data and (ii) the one or more matrix structures outputted by the feature extraction model as input to a compression engine;
obtaining, by the one or more computers, a core matrix structure as output from the compression engine; and
storing, by the one or more computers, the core matrix structure in the memory device.

10. The method of claim 9, wherein the core matrix structure is generated by the compression engine based on performing an n-mode dot product on the identified portion of the tensor data that corresponds to the object represented by the one or more matrix structures.

11. The method of claim 9, further comprising:
performing, by the one or more computers, a first matrix operation on a first set of the one or more matrix structures to generate a second set of one or more matrix structures;
performing, by the one or more computers, a second matrix operation on (i) the second set of one or more matrix structures and (ii) the core matrix structure outputted by the compression engine; and
generating, by the one or more computers, a reconstructed matrix based on performing the second matrix operation, wherein the reconstructed matrix represents features of the identified portion of tensor data.

12. The method of claim 1, wherein the current condition of the object is a current level of ripeness or a current level of firmness.

13. A system comprising
a processor; and
a memory coupled to the processor and having instructions stored thereon which, when executed by the processor, cause the processor to perform operations, the operations comprising:
obtaining tensor data representing a hyperspectral image, wherein the hyperspectral image includes a first portion that depicts an object and a second portion that depicts at least a portion of a surrounding environment where the object is located, wherein the object is a first type, and wherein the hyperspectral image captures data within a wavelength range, and wherein the data within the wavelength range is usable for inferencing conditions of objects of the first type;
identifying a portion of the tensor data representing the hyperspectral image that corresponds to the first portion of the hyperspectral image;
providing the identified portion of the tensor data representing the hyperspectral image as an input to a feature extraction model, wherein the feature extraction model was trained using a training dataset to process portions of tensor data of other hyperspectral images to determine one or more matrix structures associated with the other hyperspectral images;
obtaining the one or more matrix structures as output from the feature extraction model, wherein the one or more matrix structures represent a subset of features extracted from the identified portion of the tensor data representing the hyperspectral image, and wherein the subset of the features extracted from the identified portion comprises distinguishing features usable to inference a current condition of the object; and
storing the one or more matrix structures in a memory device.

14. The system of claim 13, wherein the object depicted by the hyperspectral image is a food item, the food item being at least one of a citrus fruit, an avocado, a mango, an apple, a berry, a stone fruit, a tomato, meat, or a vegetable, and wherein the current condition of the object is current level of ripeness.

15. The system of claim 13, wherein the memory further comprises instructions, which when executed by the processor, cause the processor to perform operations comprising:
receiving, from a hyperspectral sensor, the hyperspectral image, wherein the hyperspectral sensor is configured to detect light waves having the wavelength range, wherein the hyperspectral sensor is configured to automatically select the wavelength range in response to identifying the type of the object, and wherein the wavelength range is between approximately 520 nm to 950 nm.

16. The system of claim 13, wherein the memory further comprises instructions, which when executed by the processor, cause the processor to perform operations comprising:
normalizing the identified portion of the tensor data representing the hyperspectral image, and
wherein providing the identified portion of the tensor data representing the hyperspectral image as an input to the feature extraction model comprises providing the normalized portion of the tensor data as the input to the feature extraction model.

17. A non-transitory, computer-readable medium coupled to one or more processors and having instructions stored thereon which, when executed by the one or more processors, cause the one or more processors to perform operations, the operations comprising:
obtaining tensor data representing a hyperspectral image, wherein the hyperspectral image includes a first portion that depicts an object and a second portion that depicts at least a portion of a surrounding environment where the object is located, wherein the object is a first type, and wherein the hyperspectral image captures data within a wavelength range, and wherein the data within the wavelength range is usable for inferencing conditions of objects of the first type;
identifying a portion of the tensor data representing the hyperspectral image that corresponds to the first portion of the hyperspectral image;
providing the identified portion of the tensor data representing the hyperspectral image as an input to a feature extraction model, wherein the feature extraction model was trained using a training dataset to process portions of tensor data of other hyperspectral images to determine one or more matrix structures associated with the other hyperspectral images;
obtaining the one or more matrix structures as output from the feature extraction model, wherein the one or more matrix structures represent a subset of features extracted from the identified portion of the tensor data representing the hyperspectral image, and wherein the subset of the features extracted from the identified portion comprises distinguishing features usable to inference a current condition of the object; and
storing the one or more matrix structures in a memory device.

18. The computer-readable medium of claim 17, wherein the object depicted by the hyperspectral image is a food item, the food item being one of a citrus fruit, a mango, an apple, a berry, a stone fruit, a tomato, meat, or a vegetable, and wherein the current condition of the object is current level of ripeness.

19. The computer-readable medium of claim 17, further comprising instructions, which when executed by the one or more processors, cause the one or more processors to perform operations comprising:
receiving, from a hyperspectral sensor, the hyperspectral image, wherein the hyperspectral sensor is configured to detect light waves having the wavelength range, wherein the hyperspectral sensor is configured to automatically select the wavelength range in response to identifying the type of the object, and wherein the wavelength range is between approximately 520 nm to 950 nm.

20. The computer-readable medium of claim 17, further comprising instructions, which when executed by the one or more processors, cause the one or more processors to perform operations comprising:
normalizing the identified portion of the tensor data representing the hyperspectral image, and
wherein providing the identified portion of the tensor data representing the hyperspectral image as an input to the feature extraction model comprises providing the normalized portion of the tensor data as the input to the feature extraction model.

* * * * *